(12) United States Patent
Xu et al.

(10) Patent No.: US 8,854,992 B2
(45) Date of Patent: Oct. 7, 2014

(54) ARTIFICIAL DELAY INFLATION AND JITTER REDUCTION TO IMPROVE TCP THROUGHPUTS

(75) Inventors: Xiao Xu, Des Plaines, IL (US); Hua Xu, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 994 days.

(21) Appl. No.: 12/499,868

(22) Filed: Jul. 9, 2009

(65) Prior Publication Data

US 2011/0007638 A1    Jan. 13, 2011

(51) Int. Cl.
*H04L 12/26* (2006.01)
*H04L 29/06* (2006.01)
*H04W 80/06* (2009.01)

(52) U.S. Cl.
CPC .......... *H04L 65/605* (2013.01); *H04L 69/163* (2013.01); *H04W 80/06* (2013.01); *H04L 69/16* (2013.01); *H04L 65/80* (2013.01)
USPC ........................................................ 370/252

(58) Field of Classification Search
CPC ..... H04L 65/605; H04L 65/80; H04L 69/163; H04W 80/06
USPC .......................................................... 370/252
See application file for complete search history.

(56) References Cited

U.S. PATENT DOCUMENTS

| | | | |
|---|---|---|---|
| 2002/0099854 A1* | 7/2002 | Jorgensen | 709/249 |
| 2002/0176404 A1* | 11/2002 | Girard | 370/352 |
| 2003/0053419 A1* | 3/2003 | Kanazawa et al. | 370/252 |
| 2003/0112758 A1* | 6/2003 | Pang et al. | 370/235 |
| 2003/0204565 A1 | 10/2003 | Guo et al. | |
| 2005/0111361 A1* | 5/2005 | Hosein | 370/230 |
| 2010/0120464 A1* | 5/2010 | Bjorken et al. | 455/522 |

OTHER PUBLICATIONS

Eun-Chan Park et al.: "Dynamic Bandwidth Request-Allocation Algorithm for Real-Time Services in IEEE 802.16 Broadband Wireless Access Networks", INFOCOM 2008, The 27th Conference on Computer Communciations, IEEE, IEEE, Piscataway, NJ, USA, Apr. 13, 2008, pp. 852-860.

(Continued)

*Primary Examiner* — Jason Mattis
*Assistant Examiner* — Stephen J Clawson
(74) *Attorney, Agent, or Firm* — Lerner, David, Littenberg, Krumholz & Mentlik, LLP (57) ABSTRACT

A method, a system and a base-station for automatically determining delays of data transmitted via Transmission Control Protocol (TCP) and inflating these delays in order to reduce jitter and improve TCP throughput in a communications network. A Dynamic Jitter Reduction (DJR) logic/utility operating within a communications node measures delays on a rolling basis in order to capture the delay profile. Based on the delay profile, the DJR utility determines a delay target. The DJR utility 'inflates'/augments future/expected delays toward the delay target by performing on one or more of the following: (a) using a delay based factor in the scheduler metric for TCP applications; (b) performing fine-tuning of link adaptation schemes; (c) delaying transmission of packets at the transmit or receive buffer; and (d) delaying transmission of a received TCP ACK signal from the media access control (MAC) sub-layer to TCP layer.

20 Claims, 6 Drawing Sheets

(56) References Cited

OTHER PUBLICATIONS

Belhaj, Salem et al.: "VFAST TCP: A delay-based enhanced version of FAST TCP", International Journal of Computer and Information Science and Engineering 1.1, www.waset.org Spring 2008, pp. 59-67.

Patent Cooperation Treaty, International Search Report and Written Opinion of the International Searching Authority for International Application No. PCT/US2010/040738, Nov. 11, 2010, 13 pages.

Tan, K et al.: "A Compound TCP Approach for High-Speed and Long Distance Networks", INFOCOM 2006, 25th IEEE International Conference on Computer Communications, Proceedings, Apr. 2006, all pages.

Choi, Young-Soo et al.: "Enhanced Congestion Control Algorithm for High-Speed TCP", Network and Parallel Computing, Lecture Notes in Computer Science, vol. 3779/2005, ISBN 978-3-540-29810-6, pp. 253-256, Year is 2005.

* cited by examiner

ARTIFICIAL DELAY INFLATION AND JITTER REDUCTION TO IMPROVE TCP THROUGHPUTS

BACKGROUND

1. Technical Field

The present invention generally relates to communications networks and in particular to transmission of data packets in communications networks.

2. Description of the Related Art

In Transmission Control Protocol (TCP) networks, congestion appears in intermediate network nodes (e.g., routers) when data in-flow is higher than data out-flow. In these instances the load is temporarily higher than what the resources are able to process, leading to increased delays, throughput reduction, and packet loss (although packets may be retransmitted in the case of TCP).

Current attempts to resolve congestion problems in TCP networks include the use of congestion control algorithms (CCA). Congestion control algorithms may be divided into delay based approaches and loss based approaches. In delay based approaches, the CCA makes congestion decisions to reduce data transmission rates and adjust the transmission rates based on round trip time (RTT) variations. RTT is determined based on estimates and/or actual measurements of delay. However, with delay-based congestion control algorithms an inherent problem is that if the actual propagation delay is inaccurately estimated by baseRTT (i.e., the observed minimum RTT), an unfair share of the resources occurs and severe oscillation of router queues may occur. On the other hand, loss based approaches use packet loss as the only indication of congestion. Theoretical analysis and experiments show that delay-based approaches generally have better properties, such as utilization and RTT fairness, than loss-based approaches. Nevertheless, these approaches both suffer from serious shortcomings.

BRIEF DESCRIPTION OF THE DRAWINGS

The invention itself, as well as advantages thereof, will best be understood by reference to the following detailed description of illustrative embodiments when read in conjunction with the accompanying drawings, wherein.

DETAILED DESCRIPTION OF AN ILLUSTRATIVE EMBODIMENT

The illustrative embodiments provide a method, a network communication device and a base station for automatically determining delays of data transmitted via Transmission Control Protocol (TCP) and inflating these delays in order to reduce jitter and improve TCP throughput in a communications network. A Dynamic Jitter Reduction (DJR) logic/utility operating within a communications node measures delays on a rolling basis (i.e., via a continuous data stream with no delay inflation) in order to capture the delay profile. Based on the delay profile, the DJR utility determines a delay target. The DJR utility 'inflates'/augments future/expected delays toward the delay target based on one or more of the following: (a) using a delay based factor in a scheduler metric for TCP applications; (b) performing fine-tuning of link adaptation schemes; (c) delaying transmission of packets at a transmit or receive buffer; and (d) delaying transmission of a received TCP ACK signal from a media access control (MAC) sublayer to the TCP layer.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
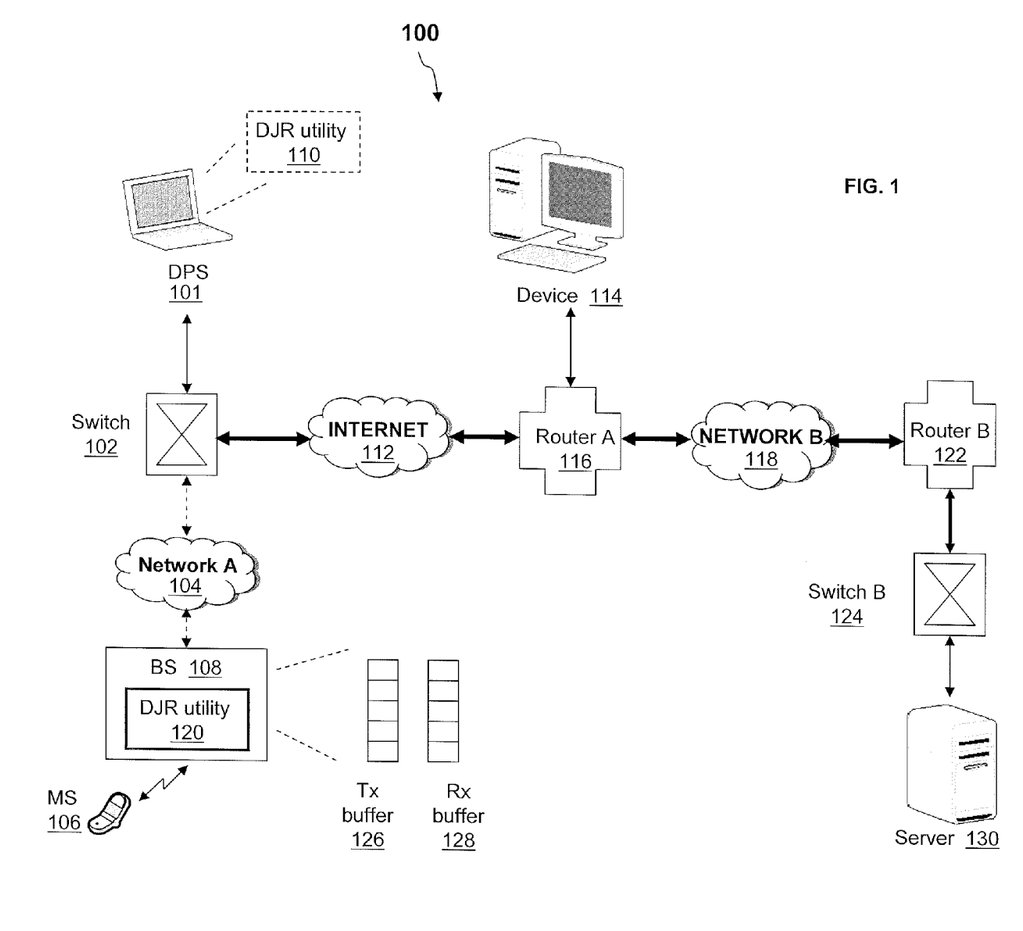
FIG. 1 illustrates an example data communications network, according to one embodiment of the present invention.

With reference now to the figures, and beginning with FIG. 1, there is depicted a block diagram representation of a data communication network 100, as utilized within one embodiment of the present invention. Network 100 comprises a source device illustrated by data processing system (DPS) 101, which is connected to switch 102. Switch 102 connects to router A 116 via network 112. Network 112 may be an public network such as the Internet or wide area network (WAN), or an private network such as an Ethernet (local area network—LAN) or a Virtual Private Network (VPN). As illustrated, base station (BS) 108 connects to switch 102 via Network A 104. In this context, switch 102 operates as an intermediate node. BS 108 is wirelessly connected to wireless device/mobile station (MS) 106. Network 100 also comprises Device 114 which accesses Network B 118 via router A 116. In addition, router A 116 connects to router B 122 via Network B 118. In addition, router B 122 is connected to switch B 124. Destination server 130 is connected to switch B 124.

In network 100, DJR utility 110 on DPS 101 detects the start of a TCP-based transmission of data intended for destination server 130. Similarly, DJR utility 120 within BS 108 detects the transmission of data which originates at source device/MS 106 and is destined for destination server 130. BS 108 may be regarded as an initiator device or a source device. Although a wireless device (e.g., MS 106) originates the data that may be transmitted to destination server 130, BS 108 schedules the communication of data between the wireless device and BS 108 and stages the data for transmission to destination server 130 via network 100. Thus, BS 108 functions as a source device with respect to the intermediate nodes along the path between BS 108 and destination server 130. DJR utility 110/120 transmits, without delay inflation, a continuous data stream corresponding to a TCP-based application 208 (illustrated in FIG. 2) towards destination server 130. The transmitted data is first received at switch 102. DJR utility 110/120 measures the delay between DPS 101/MS 106 and server 130 based on delays experienced at each hop/intermediate node (e.g., router A 116, router B 122 and switch B 124) from the source to destination. The delay encountered at each intermediate node may be seen as a sum of two principal components: a constant component which includes a propagation delay and a transmission delay, and a variable component which includes a processing delay and a queuing delay. The TCP flow delay measurements can be performed at the TCP or IP layer or may be performed at the Hybrid Automatic Repeat Request (HARQ) layer, and the resulting measurements may be utilized to assist in setting a delay target. DJR utility 110/120 determines a delay profile by using the delay measurements. The delay profile provides several statistical parameters including a mean delay, a variance of delay, and a maximum delay. In addition, DJR utility 110/120 determines a delay target based on one or more of: (a) quality of service (QoS) specifications, such as bit rate guarantees and/or delay requirements; (b) the delay profile; (c) one-time delay measurements; and (d) dynamically updated delay measurements.

In addition, DJR utility 110/120 determines/estimates expected delays for a second/future set of data packets, prior to scheduling of this second/future set of data packets for TCP transmission. DJR utility 110/120 determines/estimates the expected delays/delay profile based on one or more of: (a) previous one-time measurements; and (b) dynamically updated delay measurements. DJR utility 110/120 compares the expected delay measurements for this second/future set of data packets with the delay target.

If DJR utility 110/120 determines that the expected data delay is less than the delay target, DJR utility 110/120 'inflates'/augments/increases the smaller/expected delays to values within a preset range of the delay target. In one embodiment, DJR utility assigns a priority to the transmission of each data stream and the data streams are then ranked based on the priority assigned, such that higher priority (or higher ranked) streams/data are scheduled for transmission ahead of lower priority (or lower ranked) streams/data. The DJR utility 110/120 'inflates'/augments smaller delays toward the delay target by performing one or more of the following: (a) triggering a scheduler of a data communications node (e.g., scheduler 313 in FIG. 3, described below) to assign a lower priority/rank to the current data flow to reduce the chance that the second set of data packets is scheduled for current transmission; (b) performing fine-tuning of link adaptation schemes/procedures (see, for example, Link Adaptation Scheme/Procedure (LAS) application 312 of FIG. 3, described below); (c) delaying conveyance of packets at a transmit buffer 126 or a receive buffer 128 of a communications node (e.g., DPS 101 or BS 108); and (d) delaying transmission of a received TCP ACK signal from a media access control (MAC) layer to a TCP layer of a recipient of the ACK.

The MAC layer represents a sub-layer of the data link layer (layer 2) whereas the TCP layer is located within the transport layer (layer 4). Notably, in one embodiment, the assignment of a lower priority/rank to a current data flow may occur while the scheduler assigned a higher rank to another data flow with a better radio frequency (RF) condition. The scheduler may schedule the higher priority/ranked data flow instead of the lower priority/ranked data flow, although both data flows are current. In this embodiment, scheduling and rank assignment is based on an "artificial delay"-based factor previously added to a scheduler metric for TCP applications.

On the other hand, if DJR utility 110/120 determines that the expected data delay is not less than the delay target, DJR utility 110/120 enables data scheduling/transmission of the second set of data without augmenting the data delay. Performing fine-tuning of link adaptation schemes for flows that require delay inflation includes one of: (a) downgrading a modulation and coding scheme (MCS) to reduce the 'drain' rate of the flow buffer, which downgrading reduces interference to other users/sources and/or reduces the number of data re-transmissions and frame/slot usage; and (b) upgrading the MCS to potentially increase data re-transmissions and enable a device (e.g., DPS 101/MS 106) to send data at a higher data rate to achieve higher throughput.

By inflating delays experienced by TCP based transmissions, DJR utility 110/120 is able to reduce jitter and improve TCP throughput. Thus, DJR utility 110/120 reduces delay variance at lower layers (e.g., at the MAC or physical (RF) layers), so that the delays/RTTs perceived by TCP are measured with low delay variance. As a result, no fine-tuning is required for TCP congestion avoidance or slow start algorithms. In addition, BS 108 is able to make more efficient use of RF resources by using fewer slots, and a more conservative MCS, which leads to higher system capacity.

Figure 2:
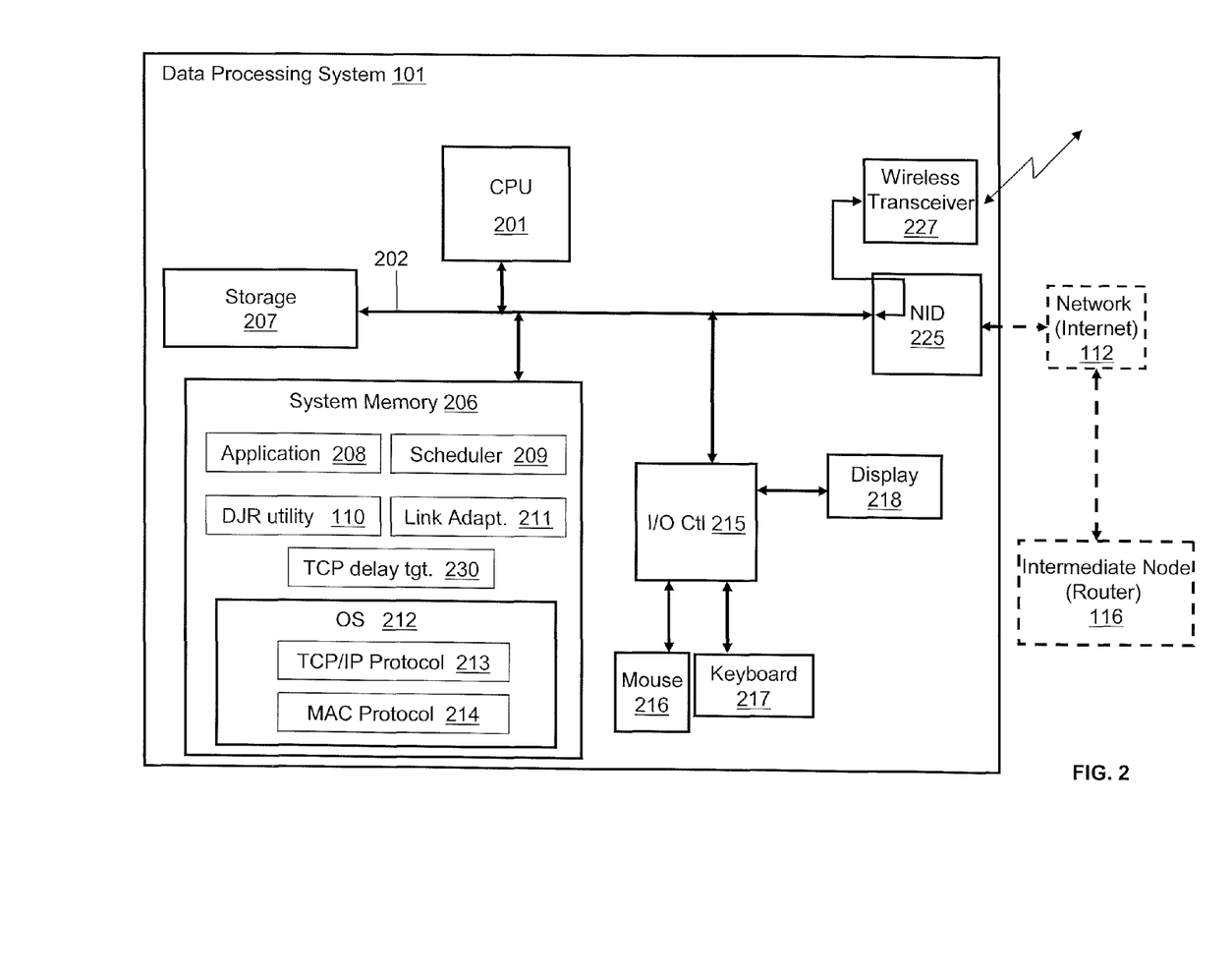
FIG. 2 provides a block diagram representation of an example data processing system within which the invention may be practiced, according to one embodiment of the present invention.

With reference now to FIG. 2, there is depicted a block diagram representation of DPS 101 according to one embodiment of the present invention. DPS 101 may be any TCP network connected device, such as a computer, a portable device, such as a personal digital assistant (PDA), a smart phone, and/or other types of electronic devices that may generally be considered processing devices and which support TCP-based network communication. As illustrated, DPS 101 comprises at least one processor or central processing unit (CPU) 201 connected to system memory 206 via system interconnect/bus 202. Also connected to system bus 202 is input/output (I/O) controller 215, which provides connectivity and control for input devices, of which pointing device (or mouse) 216 and keyboard 217 are illustrated. I/O controller 215 also provides connectivity and control for output devices, of which display 218 is illustrated. DPS 101 also comprises storage 207, within/from which data/instructions/code may also be stored/retrieved.

DPS 101 includes wireless transceiver device 227 to enable communication with wirelessly connected devices. DPS 101 is also illustrated with a network interface device (NID) 225, by which DPS 101 may connect to one or more access/external networks, such as network 112, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 225 may be configured to operate via wired or wireless connection to an access point of the network. Via the external network 112, DPS 101 may establish a connection to one or more servers (e.g., server 130), which may also provide data/instructions/code for execution on DPS 101, in one embodiment of the present invention. The connection may be through one or more intermediate nodes, which as illustrated in FIG. 1 may be network switch 102 and one or more routers (e.g., router A 116 and router B 122). As further depicted in FIG. 1, the data communications network 100 may include one or more subnets, such as network A 104 and network B 118, in addition to network 112.

In addition to the above described hardware components of DPS 101, various features of the invention are completed/supported via software (or firmware) code or logic stored within memory 206 or other storage and executed by processor 201. Thus, for example, illustrated within memory 206 are a number of software/firmware/logic components/modules, including operating system (OS) 212 which includes Transmission Control Protocol (TCP)/Internet Protocol (IP) module 213 and Media Access Control (MAC) protocol module 214. Memory 206 also includes TCP application 208 (i.e., an application which generates the data packets that are configured by the OS for transmission via TCP), delay target 230, Link Adaptation Scheme 211, and Scheduler 209. In addition, memory 206 comprises Dynamic Jitter Reduction (DJR) logic/utility 110. In actual implementation, DJR logic 110 may be combined with Scheduler 209 and perhaps one or more of the other components/modules to provide a single executable component, collectively providing the various functions of each individual component when the corresponding combined component is executed by processing components of DPS 101. For simplicity, DJR logic 110 is illustrated and described as a stand-alone or separate logic/firmware component, which provides specific functions, as described below.

Certain of the functions supported and/or provided by DJR utility/logic 110 are implemented as processing logic (or code) executed by processor 201 and/or other device hardware, which processing logic completes the implementation of those function(s). Among the software code/instructions/logic provided by DJR logic 110, and which are specific to the invention, are: (a) logic for triggering a transmission to a destination device of a continuous stream of data packets received from a TCP application (i.e., an application that generates data packets configured by the OS for transmission via TCP) executing on a source device; (b) logic for measuring values of delay of the data packets between the source device and the destination device; (c) logic for determining a delay target based on measured values of delay; and (d) logic for, when a future/expected data delay is less than the delay target, substantially augmenting/increasing an expected delay to the value of the delay target. According to the illustrative embodiment, when processor 201 executes DJR logic 110, DPS 101 initiates a series of functional processes that enable the above functional features as well as additional features/functionality. These features/functionalities are described in greater detail below within the description of FIGS. 3-6.

Figure 3:
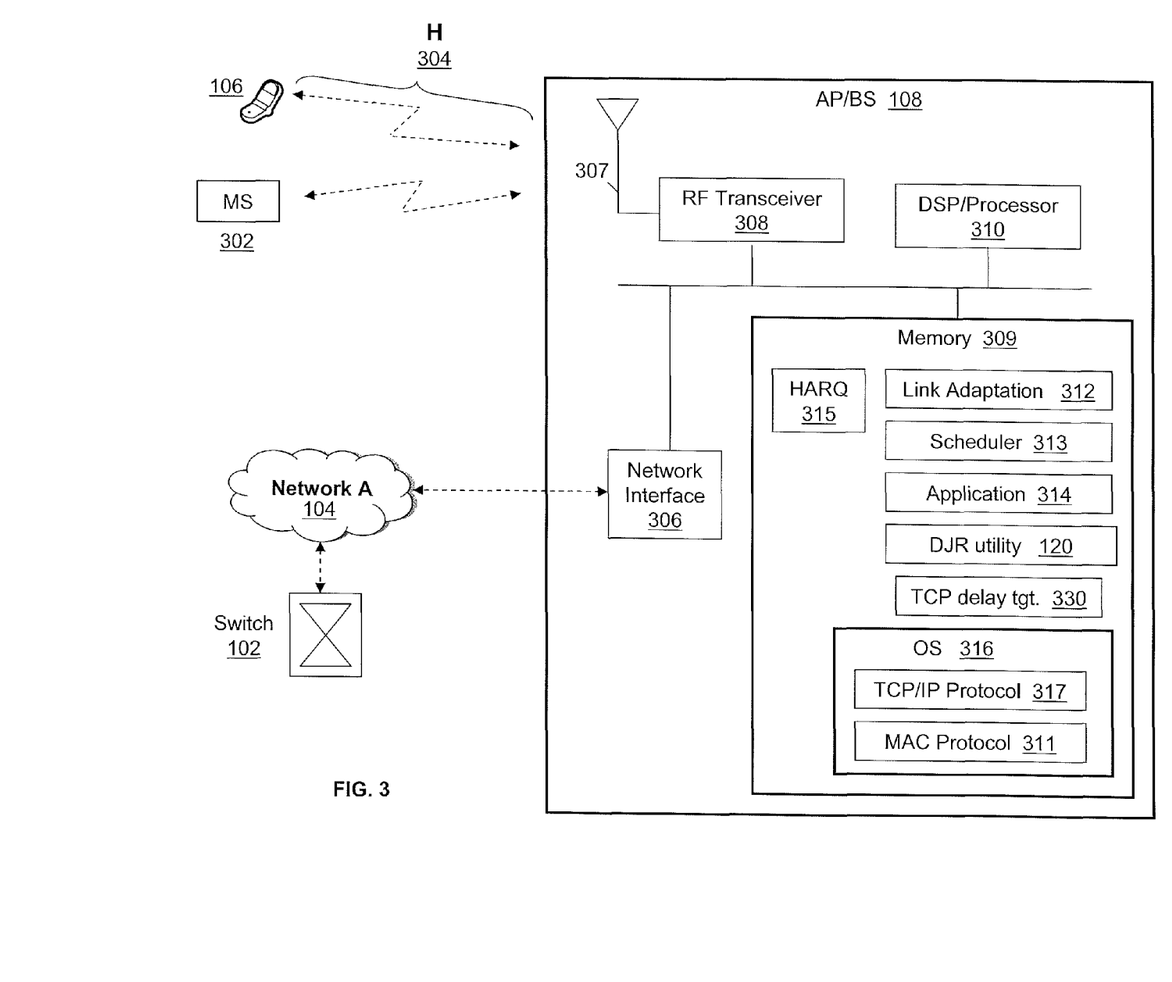
FIG. 3 illustrates a block diagram representation of a basestation within a wireless communication system, as utilized within one embodiment of the present invention.

FIG. 3 illustrates a more detailed view of base station (BS) 108 within a wireless communication system 100, which communicates data via TCP on a connected TCP network, according to one embodiment. BS 108 may be regarded as an initiator device or a source device. Although a wireless device (e.g., MS 106) originates the data that may be transmitted to a target/destination device (e.g., server 130), BS 108 schedules the TCP communication of data between the wireless device and BS 108. In addition, BS 108 schedules the TCP data transmission to the target/destination device (server 130). BS 108 operates independently of DPS 101. BS 108 provides an application of a DJR utility within a wireless initiator/system (e.g., BS 108) instead of a wired system (e.g., DPS 101). For example, BS 108 may represent a base transceiver station (BTS), an enhanced/evolved Node B (eNodeB) or a base station. Thus, DJR utility 110 within DPS 101 has substantially identical features and functionality as those of DJR utility 120 in BS 108. In the described embodiments, wireless communication system 100 may support several standards/networks, such as third generation (3G) and fourth generation (4G) networks, which include Long Term Evolution (LTE) standard.

Wireless communication system 100 may comprise multiple wireless communication devices, for example, a first mobile station (MS), such as MS 106, and a second MS, that is, MS 302. The wireless communication devices all connect to base station (BS) 108 via an antenna array 307 comprising one or more antenna elements. One or more of the wireless communication devices 106, 302 may be associated with a mobile user/subscriber. Thus, in certain instances, these wireless communication devices may be interchangeably referred to herein as user devices, mobile user devices, or users, as a general reference to the association of the device(s) to a device user. These references are however not intended to be limiting on the applicability of the invention to devices not directly associated with individual/human users. Base station 108 also may be referred to herein as an access point (AP). MS 106 and MS 302 communicate with base station 108 via (complex) channel path H 304, which connects MS 106 and MS 302 to base station 108 via the antenna array 307. BS 108 further includes a network interface 306 that interfaces with Network A 104 and provides for communication with other network nodes via Network A, and a radio frequency (RF) transceiver 308 for wireless communication, via antenna array 307, with wireless communication devices, such as MSs 106 and 302, served by the BS. BS 108 additionally comprises memory 309 and a digital signal processor (DSP)/Processor 310. While shown as a single module/device, DSP/Processor 310 may be one or more individual components communicatively coupled to each other and controlling different functions within BS 108. As illustrated, BS 108 connects to intermediate node/switch 102 via network interface 306 and Network A 104.

In addition to the above described hardware components of BS 108 within wireless system 100, various features of the invention may be completed/supported via software (or firmware) code or logic stored within memory 309 or other storage and executed by DSP/Processor 310. Thus, for example, illustrated within memory 309 are a number of software/firmware/logic components/modules, including operating system (OS) 316 which includes Transmission Control Protocol (TCP)/Internet Protocol (IP) module 317 and Media Access Control (MAC) protocol module 311. Memory 309 also includes various application layer functionality 314, HARQ functionality 315, a scheduler 313, a delay target 330, and a Link Adaptation Scheme/Procedure (LAS) application 312. In addition, memory 309 comprises Dynamic Jitter Reduction (DJR) logic/utility 120. In actual implementation, DJR logic 120 may be combined with scheduler 313 as well as with one or more of the other components/modules to provide a single executable component, collectively providing the various functions of each individual component when the corresponding combined component is executed by processing components of BS 108.

Those of ordinary skill in the art will appreciate that the hardware components and basic configuration depicted in FIGS. 2 and 3 may vary. The illustrative components within DPS 101 and BS 108 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

In one embodiment, the DJR utility may be distributed as individual components within separate nodes of the communication network, including the intermediate nodes. In addition, DJR utility 110 within DPS 101 and DJR utility 120 within base station 108 may provide identical features and functionality of the distributed DJR utility.

In DPS 101/BS 108, DJR utility/logic 110/120 detects and inflate delays of data transmitted via TCP, in order to reduces jitter and in turn improve TCP throughput. The TCP throughput of a communication is limited by two windows: (a) a congestion window; and (b) a receive window. In TCP, the minimum of the congestion window (cwnd) and the receive window determines the number of bytes that can be outstanding at any time. The congestion window is a means of stopping the link between two places from getting overloaded with too much traffic. The size of the congestion window is calculated by estimating how much congestion there is between the two places. The sender maintains the congestion window. A TCP receiver window tries not to exceed the capacity of the receiver to process data (flow control). Thus, the TCP window size is controlled by the minimum of the congestion window and the receive window. DJR utility 110/120 enables the achievable TCP throughput to approach the throughput limits defined by these windows.

Figure 4:
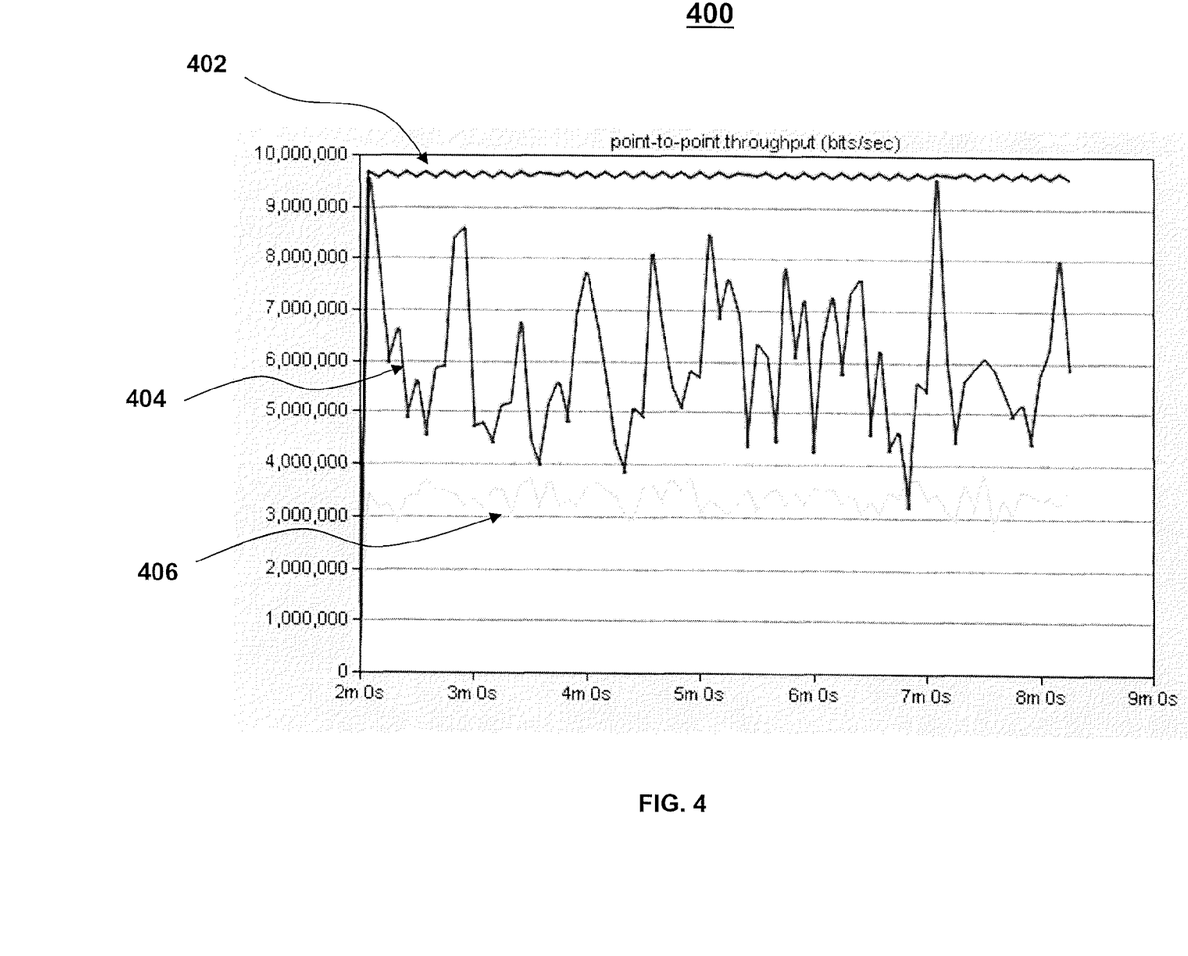
FIG. 4 depicts a graph which shows the instantaneous throughput for data streams employing different levels of artificial delay inflation.

FIG. 4 depicts a graph 400 which shows the instantaneous throughputs for data streams employing different levels of artificial delay inflation and that illustrates the benefits of the present invention. A vertical axis of graph 400 represents throughput, in units of bits per second, and a horizontal axis of graph 400 represents time, in units of milliseconds (ms). Graph 400 comprises first waveform 402, second waveform 404 and third waveform 406. Graph 400 is based on a simulation involving a client (e.g., a simulated version of DPS 101/BS 108) and a server (e.g., a simulated version of server 130). The server transmits data downstream to the client. A fixed application frame size of 1400 bytes per frame is utilized. Routers (similar to router A 116 and router B 122 of FIG. 1) along the transmission path are configured for queue management in which a FIFO queue with a maximum queue size of 500 packets is utilized. On detection/receipt of data packets, the client responds to the server only with a TCP acknowledgement signal, TCP ACK.

Graph 400 provides the results of the simulation in which a TCP receive window of 65535 bytes is employed. In graph 400, first waveform 402 is the result of a data transmission in which a constant delay inflation of 55 ms is used. According to graph 400, a substantially constant throughput of approximately 9.7 million bits per second is achieved. Second waveform 404 results from a data transmission in which a delay inflation of 55 ms is applied to 95% of the data packets and a delay inflation of 10 ms is applied to 5% of the data packets. Thus, the average/mean delay inflation is calculated to be 52.75 ms. The delay variance is 96.18. Third waveform 406 results from a data transmission in which a delay inflation of 55 ms is applied to 5% of the data packets and a delay inflation of 10 ms is applied to 95% of the data packets. Thus, the average/mean delay inflation is calculated to be 12.25 ms. The delay variance is 96.18.

The results of the simulation show that given a sufficiently large TCP receiver window size, a high mean/average delay and a low coefficient of variation (CoV) results in a higher throughput compared with low mean/average delay and a high CoV. The coefficient of variation is obtained as follows:

CoV=Standard Deviation/Mean of packet delay distribution. Thus, TCP flows with constant, yet higher delays have better throughput. A flow with a large delay variance has a lower throughput than a flow with a constant, yet large delay. When different flows have the same variance, the flow with a larger mean delay has a greater throughput since TCP is less likely to hit a slow start. Thus, DJR utility 110/120 enables TCP to adapt to different delays (RTTs) and jitter profiles to arrive at the achievable throughput.

Figure 5:
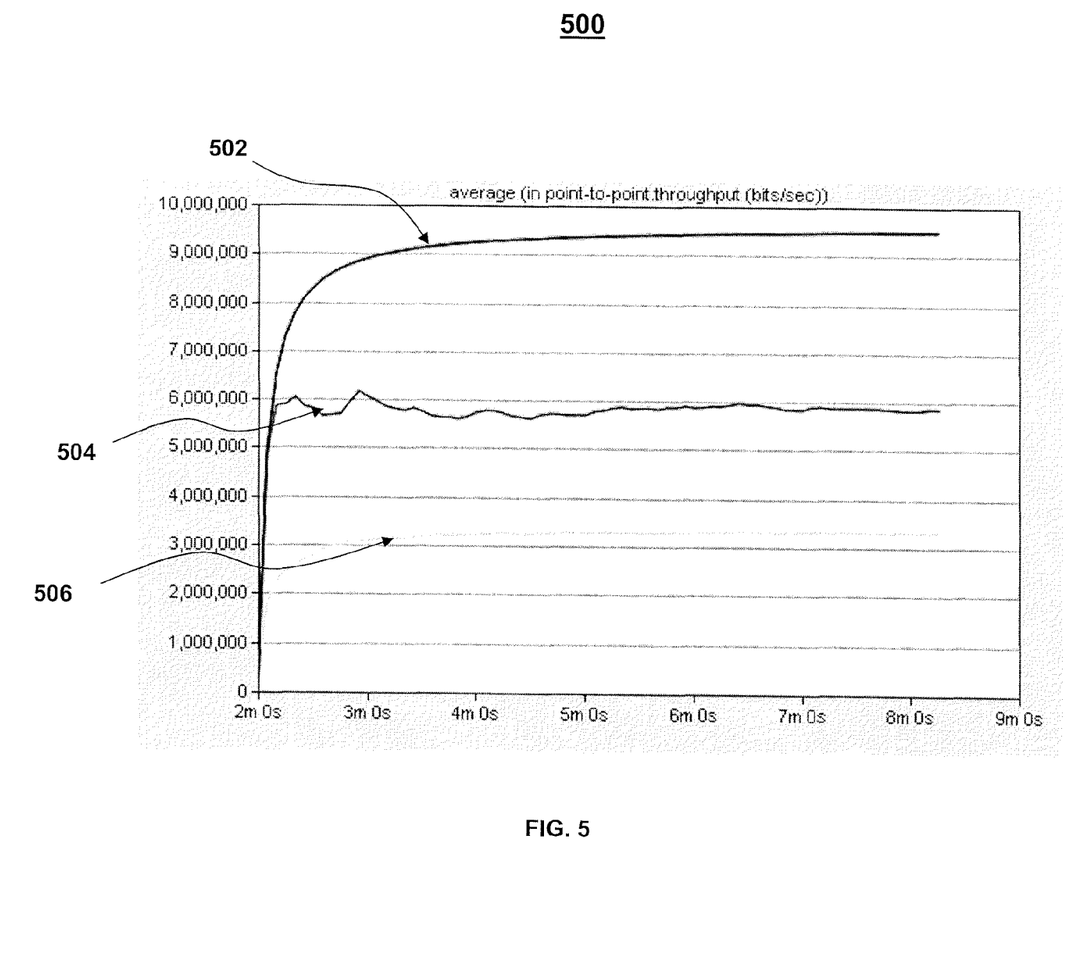
FIG. 5 depicts a graph which shows the average throughput for data streams employing different levels of artificial delay inflation.

FIG. 5 depicts a graph 500 which shows the average throughput for data streams employing different levels of delay inflation and that illustrates the benefits of the present invention. A vertical axis of graph 500 represents throughput, in units of bits per second, and a horizontal axis of graph 500 represents time, in units of milliseconds (ms). Graph 500 comprises first waveform 502, second waveform 504 and third waveform 506. Graph 500 is a result of obtaining an average (e.g., a moving average) of throughput values over a specific time interval for each of multiple continuous data streams with a specific delay profile. In graph 400, the instantaneous throughput of each continuous data stream with a specific delay profile is represented by the respective waveform (i.e., first waveform 402, second waveform 404 and third waveform 406). After a continuous data stream is established, first waveform 502 indicates an average throughput of about 9.4 million bits/second. Second waveform 504 indicates an average throughput of about 5.9 million bits/second. Third waveform 506 indicates an average throughput of about 3.2 million bits/second. Graph 500 verifies the conclusion of graph 400, that is, that data flows with delay variance have lower throughput than data flows with constant, yet large delay.

Figure 6:
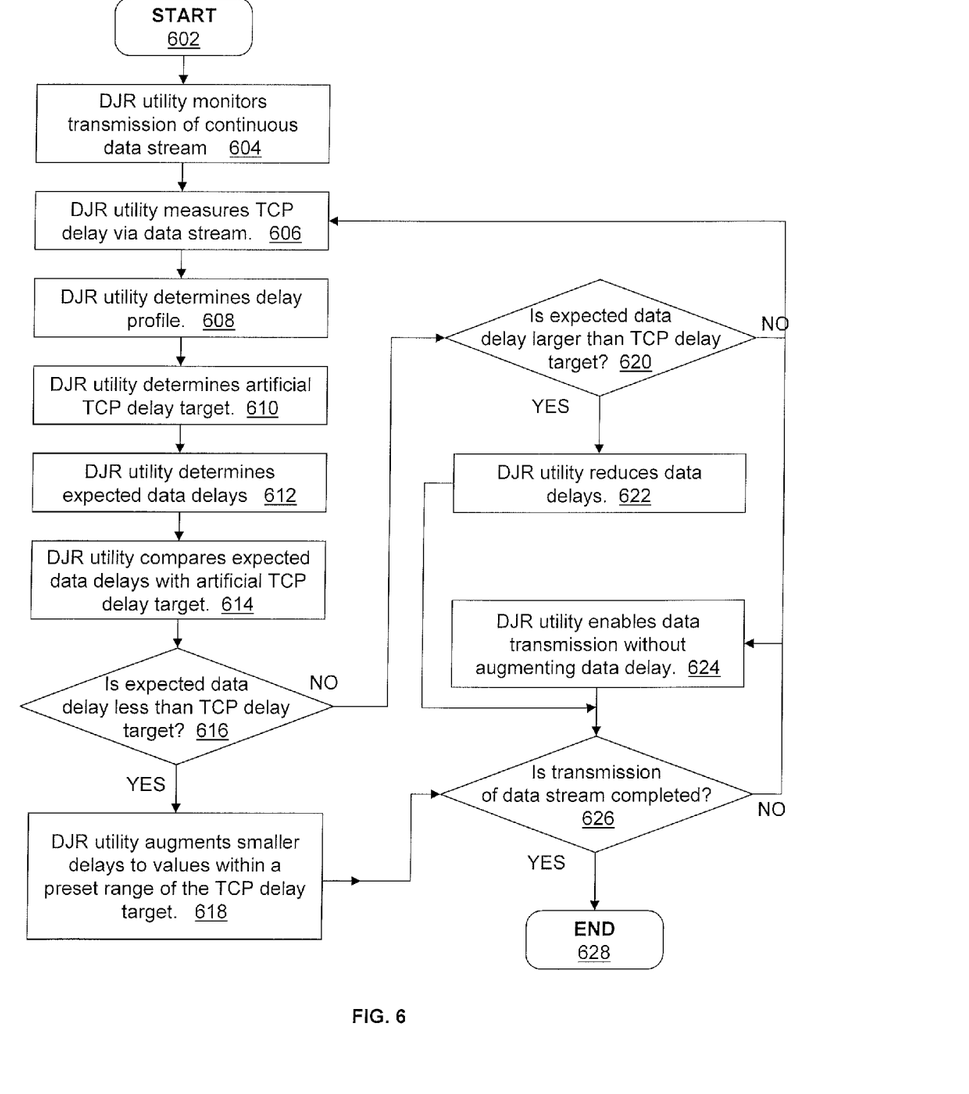
FIG. 6 is a flow chart illustrating the process of obtaining higher levels of data throughput by determining the delay target and augmenting expected delays towards the delay target, according to one embodiment of the present invention.

FIG. 6 is a flow chart illustrating a method by which the above processes of the illustrative embodiments of the present invention are completed. In particular, FIG. 6 illustrates a process of obtaining higher levels of throughput by determining the delay target and augmenting expected delays towards the delay target, during the transmission of data packets. Although the method illustrated in FIG. 6 may be described with reference to components shown in FIGS. 1-5, it should be understood that this is merely for convenience and alternative components and/or configurations thereof can be employed when implementing the method. Key portions of the method may be completed by DJR utility 110/120 executing on a processor (e.g., Processor 201 within DPS 101 or DSP/processor 310 within BS 108) and controlling specific operations of/on DPS 101/BS 108. The method is thus described from the perspective of either/both DJR utility 110/120 and DPS 101/BS 108.

The process of FIG. 6 begins at initiator block 602 and proceeds to block 604, at which DJR utility 110/120 detects the start of the transmission of a continuous data stream from a TCP application on a source device (e.g., MS 106/302) to a destination device (e.g., server 130). In the context of the MS 106/302 operating as the source device generating the transmitted data, DJR utility 120 enables BS 108 to operate as a "TCP source" device within the TCP connected network. Network detected delay values, that is, delays detected by intermediate network nodes through which the data stream passes, are returned to, and stored in the memory 309 of, the BS 108, and in one embodiment, delay measurements and adjustments are performed based on network characteristics seen and/or recorded by the BS 108 rather than the MS 106/302. Returning to the flow chart, at block 606, DJR utility 110/120 measures a delay between the source device and the destination device for a first group of data packets within the data stream, based on delay components received from the intermediate nodes. In particular, the delay is determined based upon notification about the delay components at the respective nodes that is sent back to the source device (captured at BS 108 when the actual source device is MS 106/302), based on the first group of transmitted data packets. The delay determination may be based on one or more of: (a) an end to end delay, (b) a delay from the source device to an intermediate node, (c) a delay from an intermediate node to the destination device; (d) hop by hop delay, and (e) measurements performed at the HARQ layer.

At block 608, DJR utility 110/120 determines a delay profile based on the delay. The delay profile provides several statistical parameters including a mean of the delay, a variance of the delay, and a maximum delay. At block 610, DJR utility 110/120 determines an artificial delay target based on one or more of: (a) quality of service (QoS) specifications; (b) bit rate requirements; (c) the delay profile; (d) one-time delay measurements; and (e) dynamically updated delay measurements. At block 612, DJR utility 110/120 determines/estimates future/expected delays for a second/future group of data packets, based on one or more of: (a) previous one-time measurements; and (b) dynamically updated delay measurements. DJR utility 110/120 compares the expected delay measurements with a delay target, as shown at block 614.

At decision block 616, DJR utility 110/120 determines whether the expected data delay is less than the delay target. If, at block 616, DJR utility 110/120 determines that the expected data delay is less than the delay target, DJR utility 110/120 substantially augments/increases the expected delays up towards the delay target, as shown at block 618, and DJR utility 110/120 proceeds to block 626. DJR utility 110/120 'inflates'/augments the smaller/expected delays of data packets within the second set of data packets up towards the delay target by adding a constant/fixed delay value to all packets within the second set of data packets. The constant/fixed delay value places the delay of the second set of packets within an acceptable/threshold range of the delay target. The constant delay can be implemented by performing one or more of the following: (a) triggering a scheduler of a data communications node (e.g., scheduler 313 in FIG. 3) to assign a lower priority/rank to the current set of data packets to reduce the chance that the current set of data packets is scheduled for current transmission; (b) performing fine-tuning of link adaptation schemes/procedures 312, according to the delay target; (c) delaying transmission of packets at a transmit buffer or a receive buffer; and (d) delaying transmission of a received TCP ACK signal from a MAC layer to a TCP layer at a recipient of the ACK. With respect to feature (a), however, the scheduler alternatively, or in addition, may assign a higher priority/rank to another set of data packets that are currently scheduled, but which have/exhibit acceptable delay conditions. Scheduling and rank assignment is based on a delay based factor previously added to the scheduler metric for TCP applications In one embodiment of the present invention, BS 108 may implement HARQ functionality 315, where acknowledgements are used for retransmission decisions. HARQ is a physical layer (layer one) retransmission function in the Worldwide Interoperability for Microwave Access (WiMax) IEEE 802.16 protocol (with variants in several cellular protocols, such as in Universal Mobile Telecommunications System (UMTS)). For each burst transmitted in the link, a receiver at a client may or may not receive the burst properly, due to varying channel conditions. If the burst is received properly, an acknowledgement (ACK) message is returned. If the burst is not received properly, a negative acknowledgement (NACK) message is returned. Upon receipt of an ACK, further data bursts can be sent. Upon receipt of a NACK a retry attempt can be made to resend the same burst information.

As an example, if a data burst is sent and neither an ACK nor a NACK is returned, or if NACKs are continually received with no retry attempts being successful (i.e., HARQ failure), it may be assumed after some period of waiting in the higher layer that the burst was not received properly. Delays measured at HARQ layer can be used as the delay profile to help set the delay target. HARQ can also be used to achieve the purpose of delay inflation when the number of HARQ retransmissions is increased based on link adaptation.

Referring again to FIG. 6, if at block 616 DJR utility 110/120 determines that the expected data delay is not less than the delay target, DJR utility 110/120 proceeds to block 620, at which, DJR utility 110/120 determines whether the expected data delay is larger than the delay target. If, at block 620, DJR utility 110/120 determines that the expected data delay is larger than the delay target, DJR utility 110/120 substantially reduces the larger delays down towards the delay target, as shown at block 622, and DJR utility 110/120 proceeds to block 626.

DJR utility 110/120 is able to reduce the larger delays by performing one or more of the following: (a) triggering a scheduler of a data communications node (e.g., scheduler 313 in FIG. 3) to assign a higher priority/rank to the current set of data packets to increase the chance that the current set of data packets is scheduled for current transmission; (b) adjusting link adaptation schemes/procedures 312, according to the delay target; (c) expediting transmission of packets at the transmit or receive buffer; and (d) expediting transmission of a received TCP ACK signal from the MAC layer to the TCP layer.

If, at block 620, DJR utility 110/120 determines that the expected data delay is not larger than the delay target, DJR utility 110/120 enables data transmission without augmenting the data delay, as shown at block 624, and DJR utility 110/120 proceeds to block 626. At block 626, DJR utility 110/120 determines whether the continuous data stream is ended. If, at block 626, DJR utility 110/120 determines that the continuous data stream has not ended, the process returns to block 606, at which, DJR utility 110/120 calculates delays for a group of packets currently being transmitted along the path between source and target. In one embodiment, when the process returns to block 606, DJR utility 110/120 effectively updates the values/parameters from the delay profile based on current TCP transmission of data packets. DJR utility 110/120 updates these delay profile values to account for any changes in the transmission load. In addition, any changes in QoS specifications and/or delay requirements may be factored into a subsequent determination of an updated value for the delay target. If, at block 626, DJR utility 110/120 determines that the continuous data stream is ended, the process ends at block 628.

In the flow chart above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

The illustrated and described embodiments provide, in a base station, a mechanism and system that triggers the transmission of a continuous data stream from a TCP application on a source device to a destination device. The DJR logic/utility measures values of delay between the source device and the destination device, and the DJR logic determines the delay profile by using the values of delay. From the delay profile, the DJR logic obtains several parameters including the mean delay, the variance of delay and the maximum delay. The DJR logic determines a delay target based on a maximum delay of data frames corresponding to a threshold minimum percentile of delay values within the delay profile. When the DJR logic determines that an expected data delay is less than the delay target, the DJR logic augments the expected delays to values within a preset range of the delay target.

As will be appreciated by one skilled in the art, the present invention may be embodied as a method, system, and/or logic. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as memory 206 of DPS 101 (FIG. 2) or a hard disk, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for delay adjustment comprising:
   detecting transmission via transmission control protocol (TCP) of a continuous stream of data packets from a source device to a destination device located on a TCP network;
   calculate one or more statistical parameters associated with one or more groups of data packets within the continuous data stream, wherein the one or more statistical parameters comprise one or more of a mean delay, a variance of delay, and a maximum delay of the continuous data stream;
   determining a delay target for transmission of the continuous stream based on the calculated one or more statistical parameters;
   prior to scheduling a second group of data packets from within the continuous stream for transmission on the TCP network, calculate an expected data delay for the second group of data packets;
   comparing the expected delay with the target delay;
   when the expected data delay is less than the delay target, increasing the data delay to a delay value that is within a present range of the delay target by delaying transmission of a received TCP ACK signal from a media access control(MAC) protocol layer to a TCP layer; and
   when the expected data delay is larger than the delay target, reducing the data delay down towards the delay target by expediting transmission of a received TCP ACK signal from the MAC layer to the TCP layer.

2. the method of claim 1, wherein said modifying further comprises:
   when the expected data delay is substantially equal to the target, transmitting data without augmenting the data delay.

3. The method of claim 1, further comprising:
   increasing the data delay toward the delay target by performing one or more of the following: triggering a scheduler of a data communications node to assign a lower priority to the current data flow to reduce the chance that the current data flow is scheduled for current transmission, wherein said lower priority is assigned based on a delay factor, which is calculated based on the delay target; performing fine-tuning of corresponding link adaptation schemes; and delaying transmission of packets at a transmit or receive buffer; and
   reducing the data delay down toward the delay target by performing one or more of the following: triggering the scheduler to assign a higher priority to the current set of data packets to increase the chance that the current set of data packets is scheduled for current transmission; adjusting link adaptation schemes, according to the delay target; and expediting transmission of packets at the transmit or receive buffer;
   wherein said delay factor is a dynamically determined or preset parameter;
   wherein said delay factor is utilized by the scheduler to initiate transmission of data from applications which use TCP.

4. The method of claim 3, further comprising:
performing fine-tuning of link adaptation schemes via one or more of the following: downgrading a modulation coding scheme (MCS) to reduce a 'drain' rate of a flow buffer; and upgrading the MCS to potentially increase the number of re-transmissions needed for a packet; and
wherein said retransmissions are executed by one or more retransmission functions, wherein said retransmission functions include HARQ.

5. The method of claim 1, wherein said calculating further comprises:
receiving one or more values of measurements of delay for a first group of data packets from the continuous stream;
determining a delay profile of a first group of data packets by using said values of delay received; and
obtaining from the delay profile a plurality of parameters including the mean delay, the variance of delay and the maximum delay.

6. The method of claim 5, wherein determining a delay profile comprises determining a delay profile based on one or more of: an end to end delay; a delay from source device to intermediate node; a delay from intermediate node to the destination device; hop by hop delays; and measurements performed at the HARQ layer.

7. The method of claim 1, wherein:
the network communication device is a base station and the source device is a wireless communication device.

8. A base station comprising:
a transceiver mechanism that supports data communication via a wireless network between the base station and one or more wireless devices; and
a network interface that enables the base station to transmit and receive data to and from one or more network connected devices via a TCP enabled network;
a processor that is configured to:
  detect transmission via transmission control protocol (TCP) of a continuous stream of data packets from a source device to a destination device located on a TCP network;
  calculate one or more statistical parameters associated with one or more groups of data packets within the continuous data stream, wherein the one or more statistical parameters comprise one or more of a mean delay, a variance of delay, and a maximum delay of the continuous data stream;
  determine a delay target for transmission of the continuous stream based on the calculated one or more statistical parameters;
  prior to scheduling a second group of data packets from within the continuous stream for transmission on the TCP network, calculate an expected data delay for the second group of data packets;
  comparing the expected data delay with the delay target;
  when the expected data delay is less than the delay target, increasing the data delay to a delay value that is within a present range of the delay target by delaying transmission of a received TCP ACK signal from a media access control (MAC) protocol layer to a TCP layer; and
  when the expected data delay is larger than the delay target, reducing the data delay down towards the delay target by expediting transmission of a received TCP ACK signal from the MAC layer to the TCP layer.

9. The base station of claim 8, wherein the processor is further configured to modify the data delay for the second group of data packets by:
when the expected data delay is substantially equal to the delay target, transmitting data without augmenting the data delay.

10. The base station of claim 8, wherein the processor is further configured to:
increase the data delay toward the delay target by performing one or more of the following: triggering a scheduler of a data communications node to assign a lower priority to the current data flow to reduce the chance that the current data flow is scheduled for current transmission, wherein said lower priority is assigned based on a delay factor, which is calculated based on the delay target; performing fine-tuning of corresponding link adaptation schemes; and delaying transmission of packets at a transmit or receive buffer; and
reduce the data delay down toward the delay target by performing one or more of the following: triggering the scheduler to assign a higher priority to the current set of data packets to increase the chance that the current set of data packets is scheduled for current transmission; adjusting link adaptation schemes, according to the delay target; and expediting transmission of packets at the transmit or receive buffer;
wherein said delay factor is a dynamically determined or preset parameter;
wherein said delay factor is utilized by the scheduler to initiate transmission of data from applications which use TCP.

11. The base station of claim 10, wherein the processor is configured to:
perform fine-tuning of link adaptation schemes via one or more of the following:
downgrading a modulation and coding scheme (MCS) to reduce a 'drain' rate of a flow buffer; and upgrading the MCS to potentially increase the number of retransmissions needed for a packet; and
wherein the retransmissions are executed by one or more retransmission functions, wherein said retransmission functions include HARQ.

12. The base station of claim 8, wherein the processor is configured to calculate the one or more statistical parameters by:
receiving one or more values of measurements of delay for a first group of data packets from the continuous stream;
determining a delay profile of a first group of data packets based on the received delay measurements; and
obtaining from the delay profile a plurality of parameters including the mean delay, the variance of delay and the maximum delay.

13. The base station of claim 12, wherein the processor is configured to determine a delay profile based on one or more of: end to end delay; delay from source device to intermediate node; delay from intermediate node to the destination device; hop by hop delays; and measurements performed at the HARQ layer.

14. The base station of claim 8, wherein:
the base station is a network communication device and the source device is a wireless communication device.

15. A network communication device comprising:
a memory having stored therein a scheduler and a link adaptation scheme;
a network interface that enables the network communication device to communicate data to one or more receiving devices via a TCP enabled network;

at least one processor;
  a utility which when executed on the at least one processor causes the network communication device to perform the functions of:
    detecting transmission via transmission control protocol (TCP) of a continuous stream of data packets from a source device to a destination device located on a TCP network;
    calculating one or more statistical parameters associated with one or more groups of data packets within the continuous data stream, wherein the one or more statistical parameters comprise one or more of a mean delay, a variance of delay, and a maximum delay of the continuous data stream;
    determining a delay target for transmission of the continuous stream based on the calculated one or more statistical parameters;
    prior to scheduling a second group of data packets from within the continuous stream for transmission on the TCP network, calculating an expected data delay for the second group of data packets;
    comparing the expected data delay with the delay target;
    when the expected data delay is less than the delay target, increasing the data delay to a delay value that is within a present range of the delay target by delaying transmission of a received TCP ACK signal from a media access control (MAC) protocol layer to a TCP layer; and
    when the expected data delay is larger than the delay target, reducing the data delay down towards the delay target by expediting transmission of a received TCP ACK signal from the MAC layer to the TCP layer.

16. The network communication device of claim 15, wherein said functions for modifying the data delay for the second group of data packets further comprises functions for:
  when the expected data delay is substantially equal to the delay target, transmitting data without augmenting the data delay.

17. The network communication device of claim 16, said utility further comprising functions for:
  increasing the data delay toward the delay target by performing one or more of the following: triggering the scheduler of a data communications node to assign a lower priority to the current data flow to reduce the chance that the current data flow is scheduled for current transmission, wherein said lower priority is assigned based on a delay factor, which is calculated based on the delay target; performing fine-tuning of corresponding link adaptation schemes; and delaying transmission of packets at a transmit or receive buffer; and
  reducing the data delay down toward the delay target by performing one or more of the following: triggering the scheduler to assign a higher priority to the current set of data packets to increase the chance that the current set of data packets is scheduled for current transmission; adjusting link adaptation schemes, according to the delay target; and expediting transmission of packets at the transmit or receive buffer;
  wherein said delay factor is a dynamically determined or preset parameter;
  wherein said delay factor is utilized by the scheduler to initiate transmission of data from applications which use TCP.

18. The network communication device of claim 17, said utility further comprising functions for:
  performing fine-tuning of link adaptation schemes via one or more of the following: downgrading a modulation coding scheme (MCS) to reduce a 'drain' rate of a flow buffer; and upgrading the MCS to potentially increase the number of re-transmissions needed for a packet; and
  wherein said retransmissions are executed by one or more retransmission functions, wherein said retransmission functions include HARQ.

19. The network communication device of claim 15, wherein the functions for calculating one or more statistical parameters further comprises functions for:
  receiving one or more values of measurements of delay for a first group of data packets from the continuous stream,
  obtaining delay measurements based on one or more of: end to end delay; delay from source device to intermediate node; delay from intermediate node to the destination device; hop by hop delays; and measurements performed at the HARQ layer; and
  determining a delay profile of a first group of data packets delay based on the determined delay measurements; and
  obtaining from the delay profile a plurality of parameters including the mean delay, the variance of delay, and the maximum delay.

20. The network communication device of claim 15, wherein:
  the network communication device is a base station and the source device is a wireless communication device.

* * * * *